D. H. CROOK.
GRADE INDICATOR FOR VEHICLES.
APPLICATION FILED APR. 10, 1916.
1,229,041.
Patented June 5, 1917.
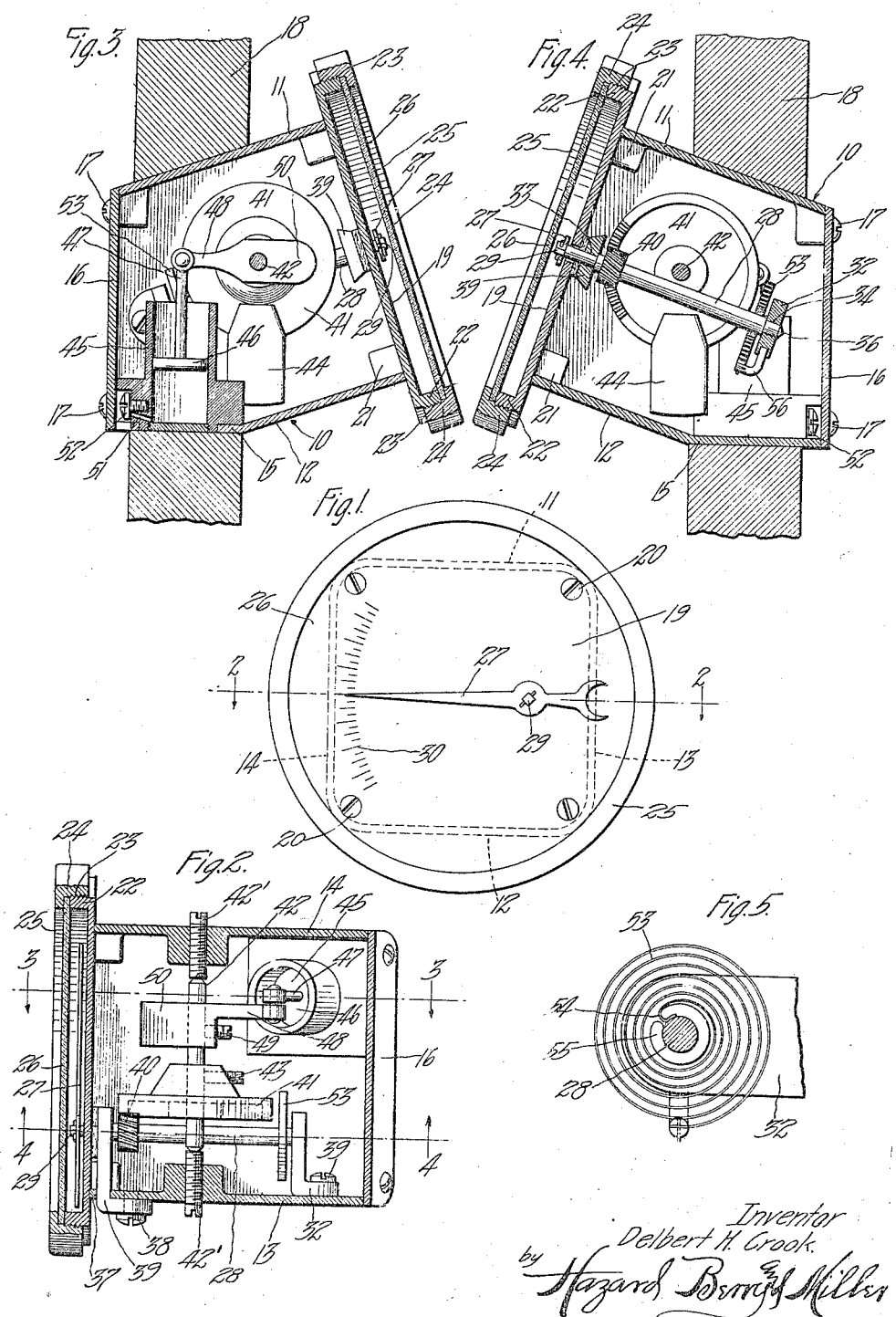
Inventor
Delbert H. Crook.
by Hazard Bemiss Miller
his Attorneys.

UNITED STATES PATENT OFFICE.

DELBERT H. CROOK, OF SAN PEDRO, CALIFORNIA.

GRADE-INDICATOR FOR VEHICLES.

1,229,041.  Specification of Letters Patent.  Patented June 5, 1917.

Application filed April 10, 1916. Serial No. 90,175.

*To all whom it may concern:*

Be it known that I, DELBERT H. CROOK, a citizen of the United States, residing at San Pedro, in the county of Los Angeles and State of California, have invented new and useful Improvements in Grade-Indicators for Vehicles, of which the following is a specification.

This invention relates to a grade indicator for vehicles.

The principal object of this invention is to provide a device for determining and indicating the grade being traversed or encountered by an automobile or other vehicle which will operate irrespective of the transverse and longitudinal inclination of the vehicle under normal conditions.

It is another object of this invention to provide a grade indicator controlled by a gravity operated mechanism and adapted to indicate the angle of grade in a manner which makes it possible for the driver to directly read the angle of inclination of the high-way.

A further object is to provide means within said indicator for making the indicating medium insensitive to road shocks.

Another object is to provide means whereby the sensitiveness of the device may be adjusted in relation to the riding qualities of the car upon which said device is applied.

Other objects will appear hereinafter.

The invention is illustrated in the accompanying drawings in which:

Figure 1 is a plan view of my indicator showing the indicating hand and its graduated dial.

Fig. 2 is a view in horizontal section on the line 2-2 of Fig. 1.

Fig. 3 is a view taken along the line 3—3 of Fig. 2 and through the dash-pot.

Fig. 4 is a view taken on the line 4—4 of Fig. 2 and in a reverse direction from Fig. 3.

Fig. 5 is a view in detail of the spiral spring and its mounting as used in my device.

Referring to the drawings, 10 indicates the main housing within which the mechanism of my indicator is mounted to operate.
The housing is, in plan, substantially square and is formed of upper and lower walls 11 and 12 and side walls 13 and 14. The lower wall 12 does not extend parallel to the wall 11 its full length, but is bent at an angle and toward the wall 11 at 15. A back 16 is provided for said housing and is secured thereto by means of screws 17. The housing 10 is adapted to be mounted within or upon a dash-board 18 of an automobile in any suitable manner and said housing preferably extends outwardly from said dash-board at an angle to facilitate in reading the indications upon a dial 19. The dial 19 is circular and acts as an end wall for the housing, it being secured thereto by means of countersunk screws 20 which engage bolting lugs 21 formed within the housing 10. The dial portion 19 is formed with an annular flange 22 which extends outwardly therefrom and is formed with threads 23 upon its outer periphery. The threads 23 are engaged by a complementary thread portion formed within a flange 24 of a bezel 25 which is adapted to secure a glass or crystal 26 within position over the face of the dial.

A hand 27 is secured intermediate the crystal 26 and the dial face 19 by means of a shaft 28 upon the squared end 29 of which it is fixedly mounted. Movement of said shaft causes the dial pointer to pass over a series of graduations 30 upon the dial face. The shaft 28 is rotatably secured within the housing within bearings 31 and 32 which are formed with bores 33 and 34 of a diameter to receive the reduced end portions 35 and 36 of the shaft 28. The bearing 31 is formed of a single piece of metal bent upon itself and at right angles and adapted to pass through an opening 37 in the side wall 13 of the housing, there being secured by means of a screw 38. The bearing 32 is of similar shape and is mounted in like manner to the inner face of wall 13 by means of a screw 39. Rotation of the shaft 28 is had by means of a worm-wheel 40 secured upon said shaft and which meshes with a crown gear 41 mounted upon a transverse shaft 42 and secured thereto by means of a set screw 43. The shaft 42 as here shown is mounted upon adjustable pivot bearings 42' and extends at right angles to the shaft 28 and is held in a single position by means of a weight 44 which depends from the crown wheel 41 and which is at all times in substantially a vertical position.

As a means for steadying the oscillating tendencies of the weight 44 around its center, I have provided the dash-pot 45 which, when mounted within the car, stands substantially vertical, this, however, not being essential to its operation, and has mounted in reciprocal relation thereto a plunger 46 connected by means of rod 47 to a rocker-arm 48 which is fixed upon the shaft 42 and held in position by means of set screw 49. The rocker-arm 48 is counter-balanced at 50 to off-set the weight of the plunger and allow the dash-pot to perform its function without hindrance. Adjustment is provided the dash-pot 45 by means of an escape passage 51 leading from the lower portion of said member 45 and obstructed by the head of an adjusting screw 52. It will thus be seen that the amount of compression within the dash-pot may be easily regulated by the raising or lowering of the screw 52, in relation to the passage 51.

Without the coiled spring 53, the indicator hand 27 acts sluggish at the moment of change in grade, and the slight lost motion, without which ordinary gears cannot be made, will cause the hand 27 to tremble. The coiled spring furnishes the required acceleration, causing the hand to respond instantly.

The coiled spring is not in tension when the indicating hand is at zero when the instrument is standing level and the pendulum weight 44 hangs vertical. The pendulum is of sufficient weight to overcome any friction of parts in the dash pot, also the force by the spring exerted against any movement of the vehicle away from the horizontal. The difference in the respective forces of the pendulum and the spring is so great that the influence of the spring is not appreciably felt when the instrument is in motion, although it may cause a slight pressure against the movement of the pendulum at the point of changing the direction away from zero. However, the trembling of the hand is effectively prevented.

In the operation of my device, after the indicator has been mounted upon the dash-board 18 of the vehicle and care has been exercised in insuring that the hand 27 stands at zero upon the dial when the car is upon level ground, the device is ready for use and its action is as follows:

The weight 44 dependent from crown gear 41 which is mounted in fixed relation to the transverse shaft 42 will normally hang downwardly and in a position directly beneath the axis of said shaft, due to gravity. As the car moves along the high-way the plane upon which the front and rear wheels rest will change in relation to the absolute horizontal and due to the fact that the weight 44 will at all times assume a vertical position in relation to its pivotal axis, the shaft 28 as well as the housing and dial will pass around said axis. This action will tend to rotate the worm-wheel 40 in relation to the crown wheel and this, as a matter of course, will swing the hand of the dial in an upward or downward direction and thus indicate the angular relation between the wheel base of the car and the horizontal.

It will readily be seen that in order to prevent continual vibration of the hand 27 as the car travels over the high-way, some means must be provided for its prevention. This is accomplished by the dash-pot 45 which cushions the movement of the plunger 46 and causes it to move only when a decided change of grade is made and continues for some distance along the high-way. When this indicator is applied to cars of different spring suspensions the amount of compression within the dash-pot may be varied by the screw in order to obtain the proper response from the device irrespective of the bound and rebound of the car. The spiral spring 53 which is mounted upon the shaft 28 at all times exerts a torsional force upon this shaft and insures its rotation.

It will thus be seen that I have provided an indicator for determining the grade of the high-way upon which an automobile is traveling which will not be sensitive to road shock, is positive in its operation, has no complicated mechanism, and displays the indicator dial in a convenient position before the driver.

I claim:

1. In a grade indicator for vehicles, the combination with a vehicle, of an indicator shaft extending longitudinally in relation to said vehicle, indicating means mounted upon said shaft, a second shaft transversely disposed to said first shaft, gravity-controlled means mounted upon said second shaft, means for transmitting rotary motion from said second shaft to said first shaft, means connected to said second shaft whereby its rotation will be retarded in cases of violent movement longitudinal of said vehicle, and means connected to said first shaft tending to rotate the same in either direction to the position assumed by said shaft when said vehicle is on a level grade.

2. In a grade indicator for vehicles, means for indicating the grade, comprising an indicator shaft having an indicator hand connected thereto, gravity-controlled means acting upon said indicating means, adjustable means for preventing undesirable vibration of said indicating means, and yieldable means tending to move said indicating means to the position normally assumed thereby when said vehicle is on a level grade, said yieldable means comprising a coiled spiral spring having its inner end connected to said shaft and its outer end fastened in fixed relation thereto.

In testimony whereof I have signed my name to this specification.

DELBERT H. CROOK.